United States Patent Office 3,708,521
Patented Jan. 2, 1973

3,708,521
CINNAMATE ESTERS OF THUJOLS
Vladimir Hach, Delta, British Columbia, Canada, and Harold G. Higson, Cincinnati, Ohio, assignors to MacMillan Bloedel Limited, Vancouver, British Columbia, Canada
No Drawing. Filed Dec. 4, 1970, Ser. No. 95,385
Int. Cl. C07c *69/76*
U.S. Cl. 260—476 C        5 Claims

ABSTRACT OF THE DISCLOSURE

Novel cinnamate esters of thujanols are described having the structural formula:

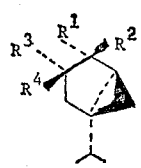

wherein $R^1$ and $R^2$ are different and represent hydrogen or methyl and $R^3$ and $R^4$ are different and represent hydrogen or

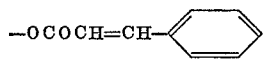

These esters are powerful odoriferous compounds which are excellent substitutes for natural styrax.

BACKGROUND OF THE INVENTION

(1) Field of the invention

This invention relates to a synthetic perfumery composition resembling the quality and characteristics of natural styrax.

(2) Description of prior art

Perfumery ingredients may be classified into two main categories, natural and synthetic. The natural products which go into perfumes are derived from both plant and animal sources. The chief plant materials used are essential oils, floral oils and resins.

The resins are a group of sticky plant exudences variously called hard resins, soft resins, balsams, gums and oleo-resins. Resins are particularly useful as blenders and fixatives. The fixatives are important components of any perfume, and serve to bind the ingredients together, diminish the rate of evaporation of the volatile components and render the odor more permanent.

Natural styrax (also known as storax) in the form of oils and resins has long been known as a valuable ingredient for use in perfumes and flavoring mixtures. For example, it is an important component of lilac, hyacinth and other floral compositions and, when used in the form of the resin, acts as a fixative. The resins and oils are obtained from the styrax tree and originate naturally as a pathological product in secretion reservoirs under the bark in old trees.

The supply of these natural materials is variable and depends on many uncontrollable circumstances. Most of it presently comes from Honduras and Guatamala. In these countries it occurs mostly in the rain forests and it will be appreciated that the transportation of the collected materials from the rain forests to commercial shipping points can be a most difficult problem. Much of it is transported in containers either manually or by mules. These factors together with the very rugged topography and unpredictable climatic conditions of these areas makes the supply of the natural product very erratic. Moreover, the natural product is very variable in odor quality.

Despite these factors, the specific odoriferous properties of styrax makes it sufficiently attractive to outweigh the great difficulties in its collection and production and its lack of uniform odor quality. It is, therefore, the object of the present invention to provide an easily obtainable synthetic substitute for the natural styrax oil and styrax resin.

SUMMARY OF THE INVENTION

In accordance with the present invention, it has been found that the cinnamate esters of thujanols are powerful odoriferous compounds which are excellent substitutes for natural styrax. These esters are novel compounds of quite unexpected properties with regard to odor quality, intensity and persistance.

Specifically, the cinnamate esters of this invention are the cinnamate esters of the four isomeric thujanols represented by the following structural formula:

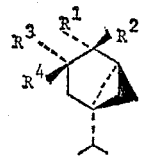

wherein $R^1$ and $R^2$ are different and represent hydrogen or methyl and $R^3$ and $R^4$ are different and represent hydrogen or

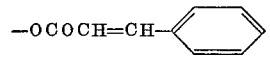

In accordance with the nomenclature proposed by H.C. Brown et al., J. Organic Chemistry 34, 3015 (1969), the above products can be named as follows:

| $R^1$ | $R^2$ | $R^3$ | $R^4$ | Product name |
|---|---|---|---|---|
| CH₃ | H | —OCOCH=CH—⟨⟩ | H | 3-neoisothujyl cinnamate. |
| CH₃ | H | H | —OCOCH=CH—⟨⟩ | 3-isothujyl cinnamate. |
| H | CH₃ | —OCOCH=CH—⟨⟩ | H | 3-thujyl cinnamate. |
| H | CH₃ | H | —OCOCH=CH—⟨⟩ | 3-neothujyl cinnamate. |

The odor quality and characteristics of the compounds of this invention not only resemble the quality and characteristics of natural styrax, but in odor intensity and persistence they surpass natural styrax. The longer lasting and characteristically styrax note of these esters makes them useful not only for their odor properties but also as effective perfume fixatives in many preparations.

The above esters can be used singly or combinations of them can be used in varying proportions. The proportions of the individual esters in the composition influence the properties of this composition only to a limited degree and does not interfere with the over all superiority of the compositions.

The esters according to this invention can be prepared by well-known techniques by esterification of the isomeric thujanols with cinnamic acid or suitable derivatives thereof. A particularly useful method of preparing these esters is by the esterification of thujanols using a cinnamoyl halide in a non-aqueous medium.

The esters obtained are viscous, colorless liquids having a boiling point in the range of 160 to 165° C. at 0.7 mm.

To prepare a final perfume composition, the esters are combined with the usual solvent vehicles, such as a special highly refined ethyl alcohol. The solvent, with its volatile nature, helps to project the scent it carries, is fairly inert to the solutes and is not too irritating to the human skin. The slight natural odor of the alcohol is removed by deodorizing or "prefixation" of the alcohol. This can be accomplished by adding a small amount of gum benzoin or other resinous fixatives to the alcohol and allowing it to mature for a week or two. The result is an almost odorless alcohol, the natural rawness having been neutralized.

DESCRIPTION OF PREFERRED EMBODIMENTS

The invention is further illustrated by the following non-limiting examples:

EXAMPLE 1

(—)-3-neoisothujanol (15.2 grams) is dissolved in 24 grams of pyridine and slowly added to a solution of 21.6 grams of cinnamic acid chloride in 200 ml. of benzene. During this addition stirring is applied. Subsequently the reaction mixture is heated to reflux for 5 hours. After cooling to room temperature the reaction mixture is filtered through an $Al_2O_3$ column containing 500 g. of alumina to remove unreacted acid chloride, cinnamic acid and pyridine-HCl. The column is washed with benzene (200 ml.) and the benzene eluates are combined, washed with dilute HCl, aqueous $NaHCO_3$ and water. Benzene is evaporated and the crude (—)-3-neoisothujyl cinnamate is distilled in vacuo at 169–172° C./1.5 mm. Hg. The yield of ester is 22.6 g. (80%). After some hours of cooling the ester crystallizes and has a M.P. of 28° C.

Elemental analysis.—Calc'd. for $C_{19}H_{24}O_2$ (percent): 80.29 C, 8.45 H, 11.26 O. Found (percent): 80.31 C, 8.44 H, 11.11 O.

Purity of the ester was determined by IR spectroscopy (absence of —OH bands, one C=O peak) and by GLC. The latter method showed a single compound The product has a styrax note and exhibits a stable odor note after several days.

EXAMPLE 2

One gram of a 1:1 mixture of (+)-3-thujanol and (+)-3-neothujanol is dissolved in 7 ml. $CH_2Cl_2$ followed by 1 g. of cinnamic acid. To the solution is then added 2 g. dicyclohexylcarbodiimide and the reaction mixture protected against air moisture is kept at room temperature for 5 days. A white precipitate of dicyclohexylurea separates. To the reaction mixture is added 50 ml. of water, the precipitate is filtered off, washed with ether and the filtrate is extracted with ether. The ether extract is combined with the ether washings of the precipitated dicyclohexylurea. The combined ether layer is washed with dilute sodium bicarbonate and evaporated. The residual crude cinnamates, (+)-3-thujyl cinnamate and (+)-3-neothujyl cinnamate, are distilled in vacuo at 147–152° C./0.1 mm. As in Example 1, the purity of this ester mixture was established by IR spectroscopy and GLC. The latter method indicated only two compounds in a ratio 1:1.

Elemental analysis.—Calc'd. for $C_{19}H_{24}O_2$ (percent): 80.29 C, 8.45 H, 11.26 O. Found (percent): 80.35 C, 8.48 H, 11.01 O.

The product exhibited a styrax note with a stable odor note even after several days.

EXAMPLE 3

A mixture (1.25 gram) of all four isomeric thujanols, namely 3-neoisothujanol, 3-isothujanol, 3-thujanol and 3-neothujanol, containing these alcohols in an approximate ratio of 1:1:1:1, is dissolved in 25 ml. benzene. To this solution 5 ml. of triethylamine and subsequently with stirring 1.75 gram of cinnamic acid chloride are added. The reaction mixture is boiled to reflux for 17 hours. The solution is cooled and filtered through a column of $Al_2O_3$ (60 g.), the column is washed with 50 ml. of benzene and the benzene solution is combined with the benzene washing. Benzne is evaporated and the residue of the crude thujyl cinnamates is distilled in vacuo at 144–151° C./0.1–0.3 mm. Hg. The yield of the ester mixture is 2.1 gram (84%). The identity of the ester mixture was confirmed by IR spectroscopy, GLC (four ester peaks) and elemental analysis.

Elemental analysis.—Calc'd. for $C_{19}H_{24}O_2$ (percent): 80.29 C; 8.45 H; 11.26 O. Found (percent): 80.39 C; 8.56 H; 11.05 O.

Organoleptic evaluations of this product by independent perfumery consultants found it to have a styrax note which was clean and more Asiatic Styrax with low styrene note. The odor was found to be very long lasting with stable odor note after several days and it was judged to be a good competitor for the natural styrax note.

We claim:
1. Thujyl cinnamate having the structural formula:

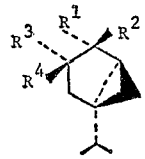

wherein $R^1$ and $R^2$ are different and represent hydrogen or methyl and $R^3$ and $R^4$ are different and represent hydrogen or

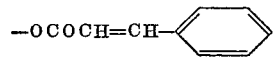

2. 3-thujyl cinnamate.
3. 3-neothujyl cinnamate.
4. 3-isothujyl cinnamate.
5. 3-neoisothujyl cinnamate.

References Cited

Groggins: Unit Processes in Organic Syntheses, pp. 596–598 (1952).

LORRAINE A. WEINBERGER, Primary Examiner

E. J. SKELLY, Assistant Examiner

U.S. Cl. X.R.

252—522